G. Irwin,
Cage Trap.

Nº 66,592. Patented July 9, 1867.

Witnesses:
Theo Fusche
J. A. Service

Inventor:
Geo Irwin
per Munn & Co
Attorneys

United States Patent Office.

GEORGE IRWIN, OF ELIZABETHTOWN, KENTUCKY.

Letters Patent No. 66,592, dated July 9, 1867.

---

IMPROVEMENT IN ANIMAL-TRAPS.

---

The Schedule referred to in these Letters Patent and making part of the same.

---

TO ALL WHOM IT MAY CONCERN:

Be it known that I, GEORGE IRWIN, of Elizabethtown, in the county of Hardin, and State of Kentucky, have invented a new and improved Rat-Trap; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved rat-trap, so constructed and arranged that the caught rat, by locking himself in the inner department, will again set the trap; and it consists in the combination of the spring-drop, upright arm or catch, horizontal arm and shaft of the outer drop-gate with each other; in the combination of the inner spring-drop, its shaft, the levers attached thereto, and the wire catches, with each other, for the purpose of unlocking the drop-gates, and in connecting the shafts of the drop-gates with each other so that opening the inner gate will open the outer gate and lock it open, the whole being constructed and arranged as hereinafter more fully described.

Figure 1:
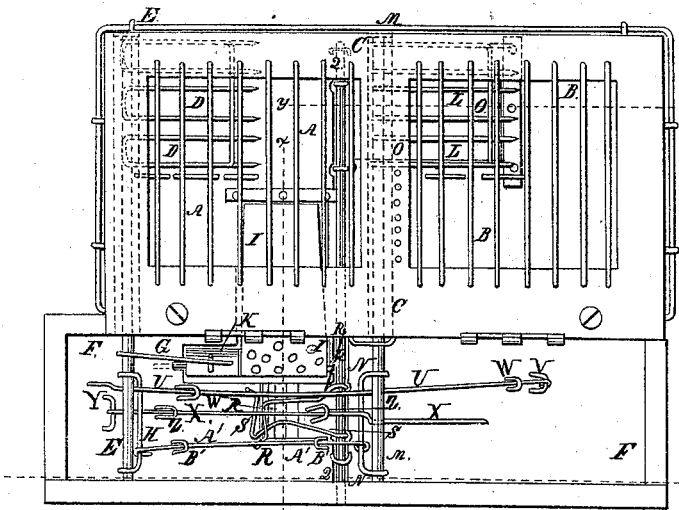
Figure 1 is a top or plan view of my improved trap, the cover of side box being removed to show the construction.
Figure 2:
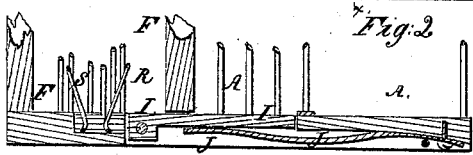
Figure 2 is a detail sectional view, taken through the line $x$ $x$, fig. 1.
Figure 3:
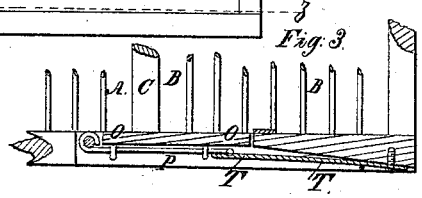
Figure 3 is a detail sectional view, taken through the line $y$ $y$, fig. 1.
Figure 4:
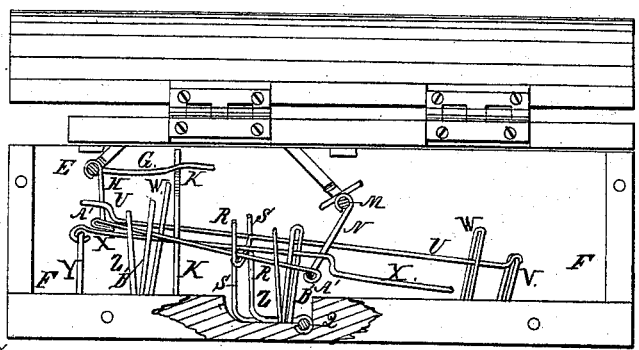
Figure 4 is a vertical longitudinal section, taken through the line $z$ $z$, fig. 1.

The main part of the trap is divided into two parts or chambers, A and B, by a partition, C. The outer chamber A has an opening through its side wall, which is closed by a drop-gate, D. The upper edge of the drop-gate D is attached to a shaft, E, which works in bearings in the side walls of the chamber A, and which extends into the side box or chamber F, attached to the side of the trap to cover and protect the operating wires. To the side of the shaft E, within the box F, is attached a horizontal arm or wire, G, and to its under side is attached a loop, H. I is a drop-board placed in the bottom of the chamber A, and which is held up by a spring, J, pressing against its lower side. The spring J is of such a strength as to allow the drop-board I to be pressed down by the weight of the rat. To the rear part of the drop-board I, which extends into the box F, or to the shaft by means of which said board is pivoted, is attached an upright arm or wire, K, having a catch or shoulder formed upon its upper end to receive the horizontal arm G to hold the drop-gate D open or set. L is a drop-gate closing the opening through the partition C, the upper edge of which is attached to the shaft M, working in bearings in the side walls of the trap, and extending into the box E, where a loop, N, is attached to its lower side, as shown in figs. 1 and 4. O is a drop-board, placed immediately beneath the drop-gate L, and which rests upon and is secured to the arms or loop P attached to the shaft Q, which passes through into the box F, and has the bent levers R and S attached to it, as shown in figs. 1 and 4. The drop-board O is held up to its place by the spring T, which presses against its lower side, and which is of such a strength that the weight of the rat will lower the drop-board O sufficiently to operate the levers R and S. U is a wire, one end of which is pivoted to a wire, V, attached to the bottom of the box F, and its other end has a shoulder or catch formed upon it to take hold of the loop H of the shaft E. The wire U is kept in its proper position by the guide wires W, as shown in figs. 1 and 4. X is a wire, one end of which is pivoted to the wire or loop Y, attached to the bottom of the box F, and its other end has a shoulder or catch formed upon it, to take hold of the loop N of the shaft M, and which is kept in proper position by the guide-wires Z, as shown in figs. 1 and 4. A' is a connecting-wire, one end of which is pivoted to the loop N of the shaft M, and the other end hooked upon the loop H of the shaft E, said wire being kept in proper position by the guide-wires B'.

When the rat enters the trap, in running about the chamber A, he steps upon the spring or drop-board I; this removes the vertical arm or wires K from under the horizontal arm or wire G, allowing the drop-gate D to drop, caging the rat. In seeking to escape, he steps upon the drop or spring-board O, which unlocks both gates by operating the levers R and S, which raise the catch or locking-wires U and X from the loops H and N of the shafts E and M. This allows him to raise the drop-gate L and pass into the chamber B. The gate L in rising, by means of the connecting-wire A, raises the gate D and again sets the trap, and as the gate L drops down again after the rat has passed through, it locks itself, leaving the rat secured in the inner chamber B.

Having thus described my invention, what I claim as new, and desire to secure by Letters Patent, is—

1. The combination of the spring-drop I, upright arm or catch K, horizontal arm G, and shaft E, of the outer gate D, with each other, substantially as herein shown and described, and for the purpose set forth.

2. The combination of the inner spring-drop O, shaft M, levers R and S, and the wire catches U and X with each other, for the purpose of unlocking the drop-gates, substantially as herein shown and described.

3. Connecting the looped shafts M and E to each other by the connecting-rod or wire A', so that the outer drop-gate D may be opened and set by opening the inner drop-gate L, substantially as herein shown and described.

GEORGE IRWIN.

Witnesses:
DAVID MATTHIS,
ROB. L. WINTERSMITH, Jr.